May 22, 1934.     H. W. ZIMMERMAN     1,959,891
BEARING HONE
Filed July 3, 1930
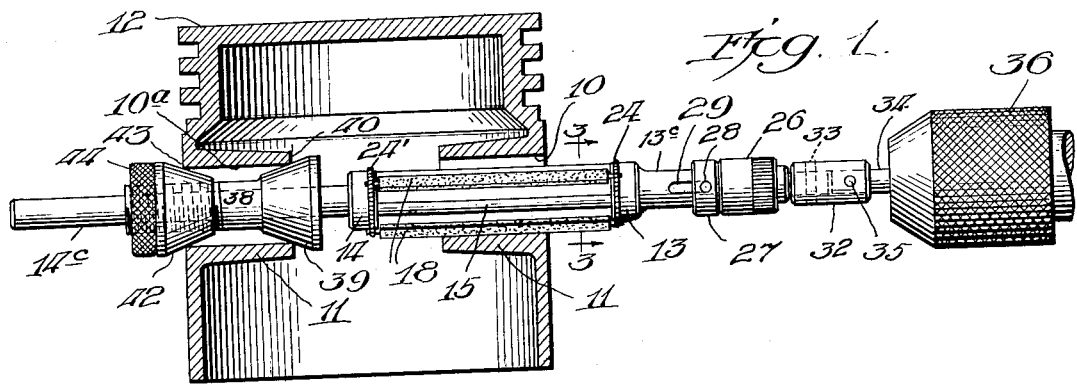
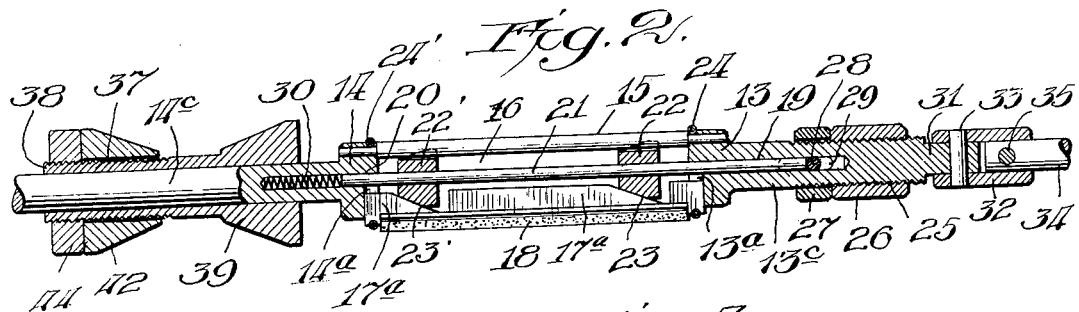
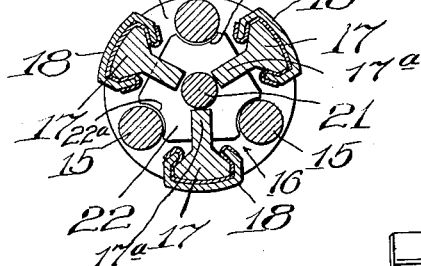
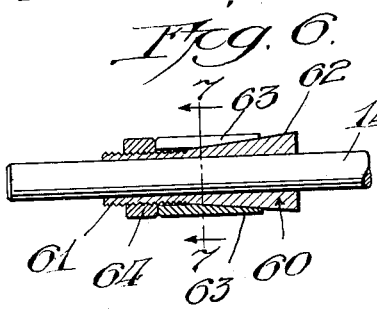
Inventor:
Herman W. Zimmerman
By Rector, Hibben, Davis & Macauley
Attys Patented May 22, 1934

1,959,891

UNITED STATES PATENT OFFICE 1,959,891

BEARING HONE

Herman W. Zimmerman, Chicago, Ill., assignor to Automotive Maintenance Machinery Co., Chicago, Ill., a corporation of Illinois Application July 3, 1930, Serial No. 465,531

4 Claims. (Cl. 51—184.3)

My invention relates generally to abrading tools, and has to do particularly with a tool of this character which is well adapted for the honing or dressing of piston pin bearings, and the like.

My invention has utility, in the honing of bearings of the foregoing character used in connection with automobile engines and, to facilitate explanation of my invention, I will refer to the same in its application to that use.

It is quite important that the piston pin bearing be smooth presenting a true-round bearing surface. Heretofore, reamers of various kinds have been used for dressing these bearings, in connection with both new and old pistons; but, in the use of a reamer, the wall surface of the bearing bore is naturally jagged presenting alternate low and high spots so that, when the true round pin is inserted in this bearing, it will engage only the high spots thereof. In fact, it has been found that, with such treatment, the maximum bearing surface for the pin does not ordinarily exceed 40 per cent of the entire bearing surface which necessarily results in quick wearing out of the pin bearing causing knocks, rattles, etc., all of which is prohibitive in high efficiency engine operation.

One form of piston pin mounting which is ordinarily used and to which my invention is particularly adaptable is that in which the piston pin is rotatably mounted in its piston bearing with the connecting rod fixedly secured thereto. It is quite desirable for highest efficiency that the separate pin bearings be truly aligned and dressed with respect to each other so that the ends of the piston pin find true bearing therein; and, one of the objects of my invention is to provide a bearing hone which includes as a part thereof a supporting means adapted to be associated with the bearings in such a way that they are accurately dressed true with respect to each other.

Another, and more specific, object of my invention is to provide a hone of the foregoing character which includes a centering-guide support adapted to be carried by one of the bearings while the other is being dressed which support so engages the honing tool as to center it with respect to the other bearing whereby both of such bearings will be dressed on the same center. More particularly, my invention contemplates a tool which includes a rotatable body portion supporting abrading elements and having an extension adapted to rotatably engage a centering device for supporting the tool as a whole, which centering device is associated with one bearing while the abrading means is associated with the other.

Other objects are to provide a tool of the foregoing character which will give the same true and smooth bearing surface throughout the dressed bearings, thereby reducing wear to a minimum and materially increasing the life of the parts; to provide a simple, efficient and inexpensive tool of this kind which may be readily used by an unskilled mechanic and which is of a character adapted to materially speed-up the dressing of the bearings, thereby reducing maintenance, and other, costs; to provide a honing tool which is provided at one end with a centering-guiding-support and at its other end with a drive means, with which drive means there is associated outside adjustment means for readily setting the abrading means during the operation of the tool, or otherwise; and to provide a novel arrangement of abrading and adjusting elements which will be described more in detail hereinafter.

Other objects and advantages will become apparent as this description progresses and by reference to the drawing wherein,—

Figure 1 is a side elevational view of one form of hone structure embodying my invention, the same being shown in its application to piston pin bearings;

Fig. 2 is a longitudinal sectional view through the honing tool of Fig. 1;

Fig. 3 is an enlarged section taken substantially on line 3—3 of Fig. 1;

Fig. 4 is a longitudinal sectional view of a modified form of centering-guiding-support means;

Fig. 5 is a section taken substantially on line 5—5 of Fig. 4;

Fig. 6 is a longitudinal sectional view through a still further modified form of centering-guiding-support means; and Fig. 7 is a section taken substantially on line 7—7 of Fig. 6.

It will be understood that while I have illustrated and will describe my invention in its application to the dressing of piston pin bearings for automobile engines, it may be used in other instances where similar conditions and problems exist. One example is the king pin bearings of automobile structures.

In Fig. 1, I have shown the tool embodying my invention in position for dressing the piston pin bearings 10, 10ª in the piston boss 11 of a conventional form of piston 12. This tool (Figs. 2 and 3) takes the form of a body portion of cage-like construction having opposed, spaced heads 13 and 14 which are rigidly joined together by a plurality of posts 15, providing a central cage space 16 and radial passageways 16ª extending therefrom. In the radial passageways 16ª I mount abrasive carriers 17 which are of general T-shape in cross section supporting abrasive members 18. This tool is of the radial-expansion, rigid type with the opposite ends of the carriers extended in tongue-like fashion as at 17ª into engagement with grooves 13ª, 14ª in the respective end plates or heads 13, 14.

Expansion and contraction of the carriers is provided for as follows: The head 13 is extended as at 13ᶜ and is provided with an axial bore 19. The head 14 is also extended as at 14ᶜ and is provided with a bore 20. In these bores, I slidably mount the ends of an adjusting stem 21 which fixedly carries a plurality of cone spreaders 22, 22'. The inner edges of the carrier bodies 17 are shaped complementally as at 23, 23' to the adjacent surfaces of the cone spreaders 22, 22' so that movement of the stem 21 in one direction will force the carrier bodies outwardly, and its movement in the other direction will permit contraction of the carriers. The opposite ends of the carrier bodies are notched to receive spring wires 24, 24' which tend at all times to hold the carrier bodies against the cones and to contract the carriers 17 when the adjusting stem is moved in the proper direction. The cage frame, and tool as a whole, is strengthened by the engagement of the posts 15 with notches 22ª in the cones 22, 22' which arrangement also prevents turning of the cones as the center stem 21 is moved.

The structure for adjusting the center stem 21 will now be described. The tool head extension 13ᶜ is threaded as at 25 to receive an adjusting nut 26. Mounted inwardly of the adjusting nut 26 and sliding freely over the stem portion 13ᶜ is a collar 27 supporting a diametrically-mounted pin 28 which passes through a slot 29 leading through the head stem 13ᶜ into the bore 19. In so passing through this bore, the pin 28 is adapted to contact with the adjacent end of the adjusting stem which is supported in the bore 19. Wherefore, clockwise rotation of the adjusting nut 26 will move the nut 26 toward the tool body and force the collar 27 in that direction, thereby moving the stem 21 (to the left looking at Fig. 2) to adjust the cone spreaders 22, 22' to expand the tool. The end of the stem 21 mounted in bore 20 engages a spring 30 which, normally, is under compression, and the foregoing expansion movement of this stem further compresses this spring; whereby, when the adjusting nut 26 is adjusted outwardly, or in anti-clockwise direction, the spring 30 forces the stem 21 and collar 27 along after the adjusting nut permitting the spring ring 24, 24' to contract the tool.

The tool is, preferably, power-driven and to that end, the head stem portion 13ᶜ has a projected reduced portion 31 which is freely received in a connecting sleeve 32 and is secured freely therein for slight rocking movement by the pin 33. This sleeve also freely receives a drive stem member 34, secured for slight rocking movement therein by pin 35, which member is adapted to be associated with a driving means such as indicated at 36 in Fig. 1, or any other suitable form of connection or power device for rotating the tool.

In using this tool to hone a bearing such as illustrated in Fig. 1, only one bearing is dressed at a time; and that bearing is centered and dressed in positive alignment with the other bearing which, in this instance, is illustrated at 10. To accomplish this, the cylindrical shaft extension 14ᶜ of the head 14 is received in a centering-guide support structure which will now be described. The preferred form of structure (Figs. 1 and 2) includes a tubular member 38, the bore of which rotatably receives the shaft 14ᶜ. This member is preferably provided at one end with an integral cone-shaped head 39, the cone surface of which is adapted to engage the inner end of the bearing 10ª as best illustrated at 40 in Fig. 1. The opposite end of the sleeve member 38 is screw threaded as at 37 and slidably receives another cone-shaped head 42 which is adapted to engage the outer edge of the bearing 10ª as at 43. To set-up this head 42 and hold it in place, I provide an adjusting nut 44 which engages the threaded portion of the member 38 as best shown in Fig. 2.

Obviously, with the foregoing structure, the shaft extension 14ᶜ of the tool is supported for a substantial part of its length by the sleeve member 38 on the center of the bearing 10ª, thus holding the tool body and abrading means centered with respect to the other bearing 10, and this latter bearing is so dressed by rotation of the tool as will be well understood. When the bearing 10 has been dressed, the tool is reversed with the centering-guide support means fixed to the bearing 10 and centered with respect thereto so that the bearing 10ª may then be dressed in centered alignment with the bearing 10. In this manner, both of the piston bearings are dressed in positive alignment with each other. Also, in the use of my invention, the bearing surfaces are true and smooth. The entire bearing surface of the two bearings is uniform, insuring maximum wear and longer life to the operating parts. The tool is positively supported and guided so that skill on the part of the operator is not required in order to attain the advantages hereinabove mentioned.

In Figs. 4 and 5, I have shown a modified form of centering-guiding support means. Specifically, this means takes the form of a guide sleeve 50 which is rotatably supported by the shaft extension 14ᶜ as in the form of Fig. 2. This sleeve is provided at one end with an integral head 51 having an inclined grooved wedge-spreading surface 52, and its other end is screw threaded as at 53. The threaded end of sleeve 50 slidably receives a head 54 which has an inclined, grooved wedge-spreading surface 55 facing the similarly-shaped surface 52 at the other end of the sleeve. Mounted between the heads 51 and 54 in the inclined surfaces 52ª, 55ª are wedge blocks 56 which have their ends shaped complementally to the inclined grooved surfaces 52ª and 55ª whereby, as the head 54 is moved toward the head 51, the blocks 56 are adjusted radially outward. As this action takes place, the blocks frictionally engage and grip the bearing and securely lock the support means therein for operation of the tool as hereinbefore described. The head 54 and blocks 56 are adjusted by means of a nut 57 which screw threadedly engages the sleeve 50 and abuts the collar 54.

In Figs. 6 and 7, I have shown a slightly different form of centering-guiding support which includes a sleeve 60 which rotatably and guidingly receives the shaft extension 14ᶜ of the tool head 14. One end of this sleeve is cylindrical and is externally threaded as at 61 and its other end tapers from the end of the threaded portion outwardly as at 62. Slidably mounted upon the tapering surface 62 is a split sleeve 63 having its bore tapered similarly to the taper 62 so that when it is moved upon the tapered surface 62 by the adjusting nut 64, such sleeve is expanded to grippingly engage the bearing. Further operation of this form of support is as hereinabove described.

While I have shown several forms of my invention, it will be understood that other changes in details and arrangement of parts may be made without departing from the spirit and scope of my invention as defined by the claims which follow.

I claim:

1. In a tool of the class described, a rotatable body having a central space with radial passages leading therefrom and axial extensions projecting outwardly from its ends, bore-contacting members mounted in said radial passages, adjusting means including an axial stem mounted in said center space for radially expanding and contracting said bore-contacting members, said extensions having axial bores in which the opposite ends of said stem are slidably received, spring means in one of said extension bores urging said item in a direction to contract said bore-contacting members, means including a slidable member mounted exteriorly upon the other of said extensions for moving said stem axially against said spring means, a guide member on said extension opposite said slidable member adapted to engage a supporting object for reciprocably and rotatably supporting said body, and means for connecting said body to a rotatable driver.

2. In a tool of the class described, a frame having a pair of end plates, an outwardly-extending axial extension on each said end plate, bore-contacting members supported by said end plates for expansion and contraction movements, means for expanding and contracting said members including a stem passing axially through said frame with its opposite ends supported by said end plate extensions, a drive connection on one of said extensions, a guide member slidably mounted on the other of said extensions, an adjusting member slidably mounted on one of said extensions and operatively connected to the adjacent end of said stem, and spring means applying pressure axially to the other end of said stem and tending to move the latter to contract said bore-contacting members.

3. In a tool of the character described, a body having spaced heads with axial extensions projecting therefrom, said extensions having axial bores therein, abrasive carriers mounted in said body for expansion-contraction movements, a stem member mounted in said body and having its ends slidably mounted in and supported solely by said bores, expansion devices fixedly carried by said stem member and engageable with said carriers for expansion-contraction movements of the latter as said stem member is moved axially, a spring in the bore of one of said extensions and urging said stem member axially to contract said abrasive carriers, exterior means on the other of said extensions connected with the adjacent end of said stem member and adjustable axially in one direction for moving said stem member against said spring to expand said carriers and adjustable axially in the opposite direction to permit said spring to move said stem member for contraction of said carriers, spring means acting on said carriers pressing the latter against said expansion devices and to contract the carriers as said spring moves said stem member, and means on said extension opposite said exterior adjustment means for supporting said body for rotary and reciprocatory movements.

4. In a tool adapted for dressing opposed, spaced bearings in centered relation with respect to each other, a body, abrading means supported by said body, means projecting axially from one end of said body adapted to be associated with drive means, a shaft projecting axially from the other end of said body, and means wedgingly engageable with one of said bearings while the other is being dressed to center and support said body including a wedge member carried by said shaft and having a wedge head engageable with one end of said one bearing, another wedge head slidably carried by said one wedge member and engageable with the other end of said one bearing, and locking means forcing said other wedge head toward the first-mentioned wedge head and both of said heads against the ends of said one bearing.

HERMAN W. ZIMMERMAN.